(12) United States Patent  
Locker et al.

(10) Patent No.: US 9,317,142 B2  
(45) Date of Patent: Apr. 19, 2016

(54) PEN DOCK FOR ELECTRONIC DEVICE

(71) Applicant: Lenovo (Singapore) Pte. Ltd., Singapore (SG)

(72) Inventors: Howard Locker, Cary, NC (US); Daniel Jordan Schantz, Raleigh, NC (US); Karen Ruth Kluttz, Raleigh, NC (US); Michaela Rose Case, Raleigh, NC (US); Scott Edwards Kelso, Cary, NC (US); Christopher Miles Osborne, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 134 days.

(21) Appl. No.: 13/897,532

(22) Filed: May 20, 2013

(65) Prior Publication Data

US 2014/0340368 A1   Nov. 20, 2014

(51) Int. Cl.
```
G06F 3/033     (2013.01)
G06F 3/0354    (2013.01)
G06F 1/18      (2006.01)
```

(52) U.S. Cl.
CPC ............ G06F 3/03545 (2013.01); G06F 1/182 (2013.01)

(58) Field of Classification Search
CPC .................................................. G06F 3/03545
USPC ......................................................... 345/179
See application file for complete search history.

(56) References Cited

U.S. PATENT DOCUMENTS

| | | | |
|---|---|---|---|
| 2003/0076302 A1* | 4/2003 | Langstraat | 345/161 |
| 2006/0044288 A1* | 3/2006 | Nakamura et al. | 345/179 |
| 2007/0236467 A1* | 10/2007 | Marshall et al. | 345/173 |

* cited by examiner

*Primary Examiner* — Jason Olson  
(74) *Attorney, Agent, or Firm* — Ference & Associates LLC

(57) ABSTRACT

An aspect provides an information handling device, including: one or more processors; a memory device that stores instructions executed by the one or more processors; and a housing that contains the one or more processors and the memory device; the housing having a substantially rectangular shape with a length and height dimension that exceed a width dimension; and the housing further comprising a shaped pen dock running along an end of the housing defining the width dimension. Other aspects are described and claimed.

20 Claims, 4 Drawing Sheets

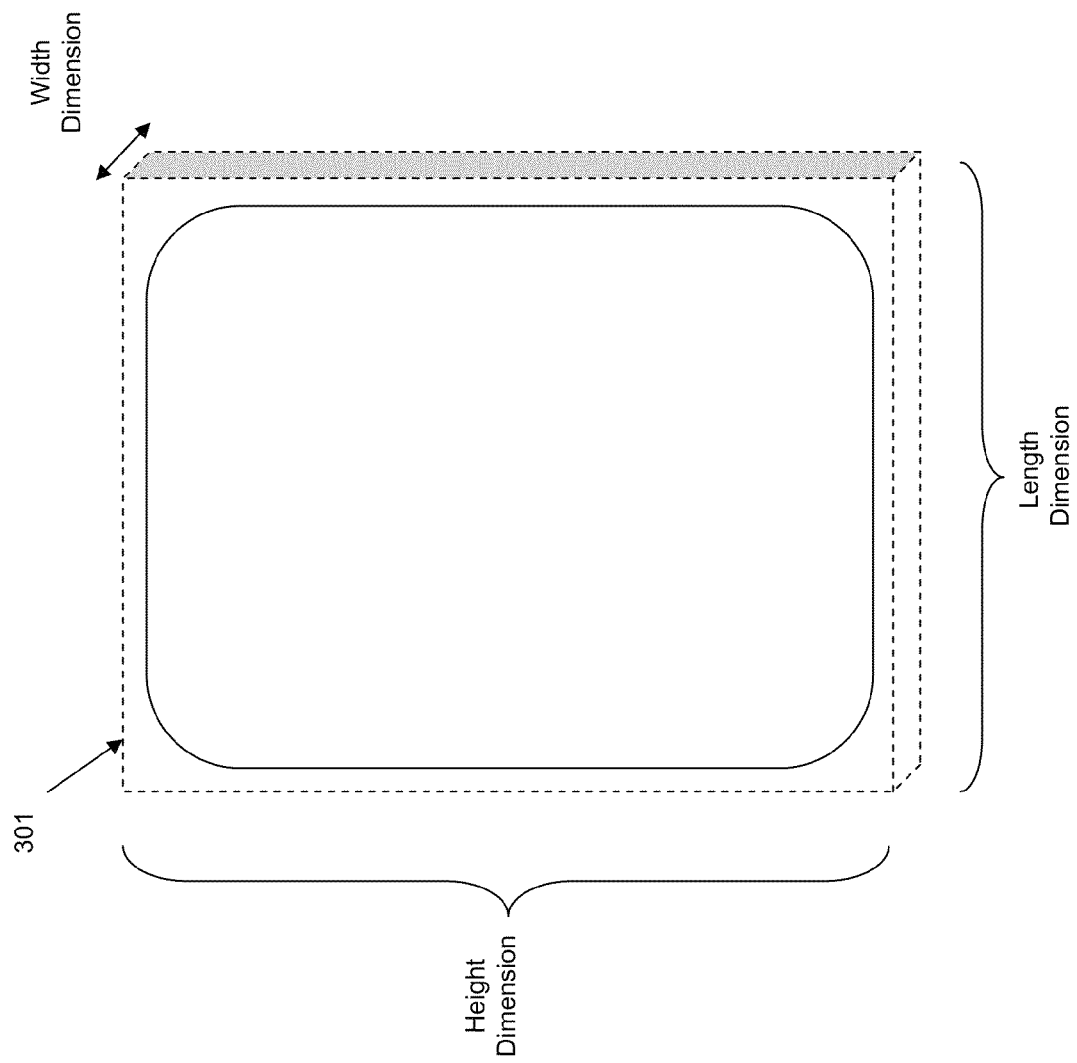

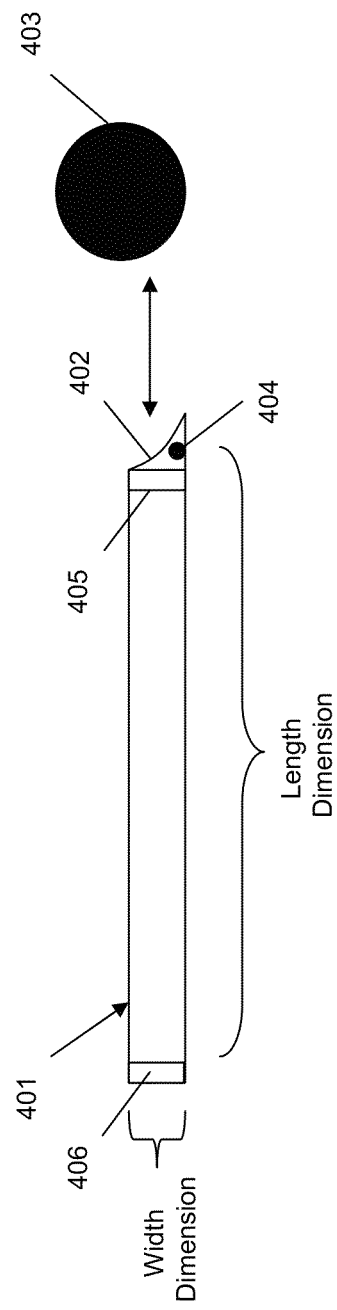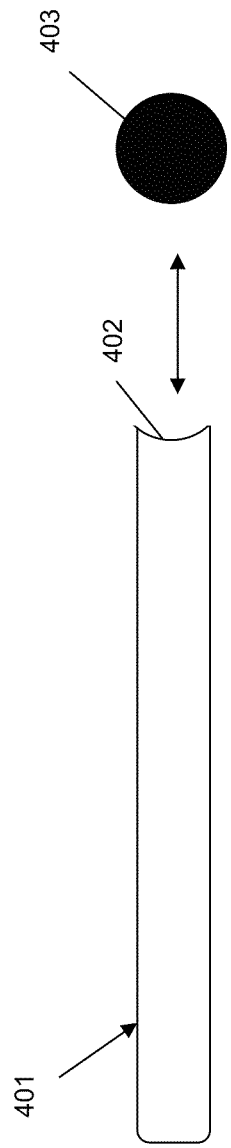
FIG. 4A
FIG. 4B

PEN DOCK FOR ELECTRONIC DEVICE

BACKGROUND

Information handling devices ("devices") come in a variety of forms, for example laptop computing devices, tablet computing devices, smart phones, e-readers, MP3 players, and the like. Many such devices configured for use with a pen or stylus (hereinafter simply "pen") as a mode of input.

Certain form factors, e.g., tablets, are very thin and are getting thinner. For example, it is common for tablets to have a thickness or width dimension on the order of approximately 7 mm or less. Nonetheless, users of these devices continue to desire the support of pen interfaces.

BRIEF SUMMARY

In summary, one aspect provides an information handling device, comprising: one or more processors; a memory device that stores instructions executed by the one or more processors; and a housing that contains the one or more processors and the memory device; the housing having a substantially rectangular shape with a length and height dimension that exceed a width dimension; and the housing further comprising a shaped pen dock running along an end of the housing defining the width dimension.

Another aspect provides a system, comprising: a pen; and an information handling device, comprising: one or more processors; a memory device that stores instructions executed by the one or more processors; and a housing that contains the one or more processors and the memory device; the housing having a substantially rectangular shape with a length and height dimension that exceed a width dimension; and the housing further comprising a shaped pen dock running along an end of the housing defining the width dimension.

A further aspect provides a method, comprising: disposing in a housing of an information handling device one or more processors and a memory device; the housing having a substantially rectangular shape with a length and height dimension that exceed a width dimension; and forming a shaped pen dock running along an end of the housing defining the width dimension.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 3 illustrates an example information handling device housing.

FIG. 4(A-B) illustrates an example information handling device having a shaped pen dock.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

The illustrated example embodiments will be best understood by reference to the figures. The following description is intended only by way of example, and simply illustrates certain example embodiments.

Figure 1:
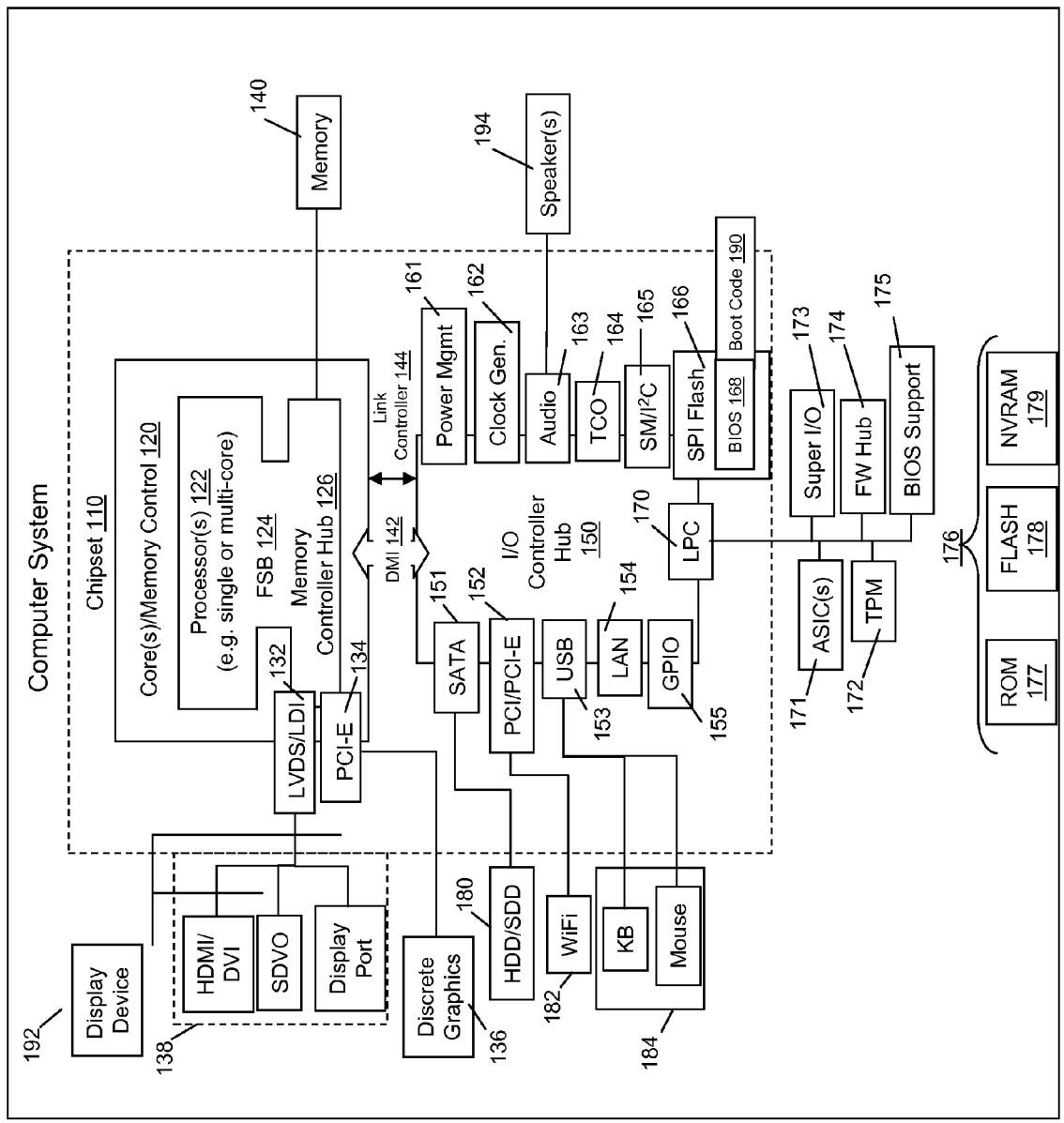
FIG. 1 illustrates an example of information handling device circuitry.
Figure 2:
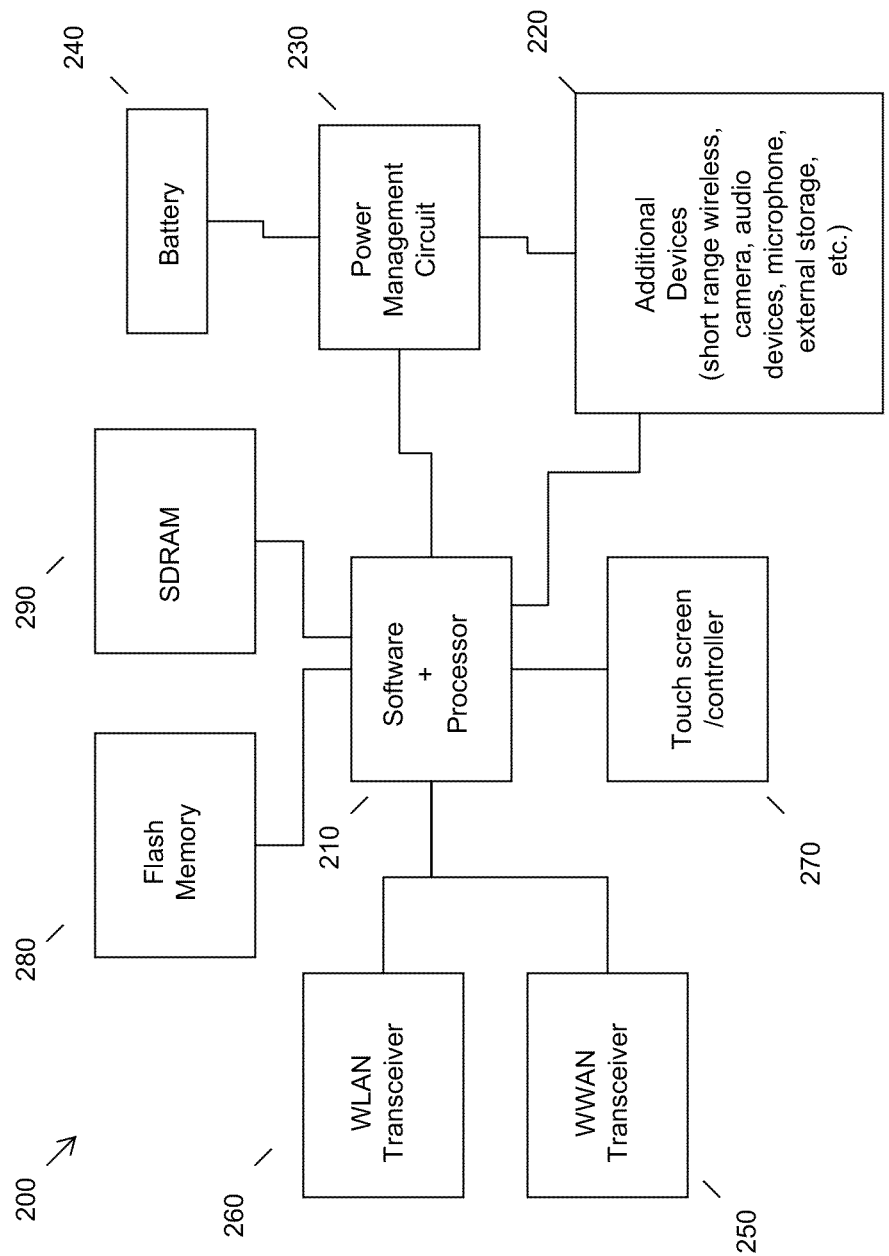
FIG. 2 illustrates another example of information handling device circuitry.

Referring to FIG. 1 and FIG. 2, while various other circuits, circuitry or components may be utilized in information handling devices, with regard to smart phone and/or tablet circuitry 200, an example illustrated in FIG. 2 includes an ARM based system (system on a chip) design, with software and processor(s) combined in a single chip 210. Internal busses and the like depend on different vendors, but essentially all the peripheral devices (220) may attach to a single chip 210. In contrast to the circuitry illustrated in FIG. 1, the tablet circuitry 200 combines the processor, memory control, and I/O controller hub all into a single chip 210. Also, ARM based systems 200 do not typically use SATA or PCI or LPC. Common interfaces for example include SDIO and I2C.

There are power management chip(s) 230, e.g., a battery management unit, BMU, which manage power as supplied for example via a rechargeable battery 240, which may be recharged by a connection to a power source (not shown). In at least one design, a single chip, such as 210, is used to supply BIOS like functionality and DRAM memory.

ARM based systems 200 typically include one or more of a WWAN transceiver 250 and a WLAN transceiver 260 for connecting to various networks, such as telecommunications networks and wireless base stations. Commonly, an ARM based system 200 will include a touch screen 270 for data input and display. ARM based systems 200 also typically include various memory devices, for example flash memory 280 and SDRAM 290.

FIG. 1, for its part, depicts a block diagram of another example of information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, touch screen, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, keyboard, mice, cameras, phones, microphones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Information handling devices, as for example outlined in FIG. 1 and FIG. 2, may provide user interfaces that accept pen input (e.g., via a digitizer or touch screen input device). Many users have become accustomed to using pen inputs. However, as described herein, the devices continue to get thinner, i.e., have reduced thickness or width dimensions, with some devices being on the order of 7 mm thick or less. It is very likely that many existing devices will become even thinner in the near future. Moreover, devices accepting pen input may include user-wearable devices, which may also have a thin profile, e.g., not sufficient for accommodating pen docks for larger diameter pens.

In order to accommodate what most users are accustomed to in terms of ergonomics, a sufficiently thick or sizable pen is required, e.g., a pen diameter that allows for ease of handling, comfort, etc. To dock a pen in a 7 mm tablet without increasing the tablet thickness requires the pen to be approximately 5 mm diameter or less. This is not desirable from a pen user experience point of view, as the pen is too thin and it is difficult for user to hold and use it. A customary pen diameter is approximately 7.5 mm to 8.5 mm. To dock (internally) this diameter pen would require a tablet at least 10 mm thick, which as above, is much thicker than the desired 7 mm or less. Simply providing a bump on the edge of the device that is thick enough to dock a thicker pen is undesirable from both an aesthetic and functional standpoint as it disrupts the overall appearance and feel of the device as well as introducing asymmetry into the device layout that may negatively impact performance (e.g., ability to lie flat on a surface).

Accordingly an embodiment provides a thin device (e.g., 7 mm or less in the width dimension) that also supports a desirable pen diameter (e.g., approximately 7.5 mm to 8.5 mm) with the ability to dock the pen with the device (e.g., tablet) without increasing the device thickness.

As illustrated in FIG. 3 is a perspective representation of an example tablet device 301. The borders of the device 301 are illustrated in dashed lines as these are the subject of modification according to one or more embodiments. In FIG. 3 it can be appreciated that the length dimension (e.g., across the bottom of the device 301) and the height dimension (e.g., along the side of the device 301) are substantially greater than or exceed the width dimension of the device (e.g., the thickness of the device 301). The width dimension defines how thick or thin the device 301 is and as described herein the devices are trending toward thinner profiles (i.e., reduced width dimension). As described herein, conventional docking mechanisms for pens (e.g., providing a circular or pen shaped slot within the device for inserting the pen into an interior cavity of the device) is not viable while maintaining the current trend towards reduced width dimensions, unless reduced pen diameters are accepted.

FIG. 4A illustrates an end view of a device, e.g., as viewed from the side facing the length dimension in FIG. 3. Here it can be appreciated that an embodiment provides a device 301 having a housing that includes a shaped pen dock 402 that accommodates a pen 403 having a diameter that is larger than the width dimension of the device 402. That is, the pen 403 to be docked is thicker than the device 401 housing, thus precluding insertion of the pen 403 within the housing of the device 401, as conventionally known.

An embodiment, rather than adding a "bump" or additional housing mechanism to the outside of the device 401 and thus disrupting the overall profile of the device 401, instead includes a shaped pen dock 402 which is shaped, e.g., curved as illustrated, to accommodate the shape or curvature of a pen 403 (also shown in an end-on view). The shaped pen dock 402 may also include one or more magnets 404 for securing the pen 403 (e.g., a pen made from or including a metallic material that is attracted to the magnet). This allows a shallow curve (or shape corresponding to the pen shape) to secure the pen 403 to the shaped pen dock 402.

The shaped pen dock 402 may take a variety of forms. The shaped pen dock 402 may be symmetric, as illustrated in FIG. 4B, or asymmetric, as illustrated in FIG. 4A. Therefore, the shaped pen dock 402 may take a variety of shapes that match or compliment the shape of the pen to be docked therein. Moreover, the shaped pen dock 402 may take up the entire width dimension (as illustrated in both FIG. 4A and FIG. 4B) or take up less than the entire width dimension of the device 402. As can be appreciated, the amount of surface contact between the pen 403 and the shaped pen dock 402, the particular shapes chosen for these elements, as well as the strength and/or positioning of the magnet(s) will impact the ability to retain a pen 403 that exceeds the width dimension of the device 401.

An example embodiment, illustrated in FIG. 4A, uses a combination of percent of a total circle (assuming a circular pen 403) on the edge of the device 401 for forming the shaped pen dock 402 along with a magnetic connection (e.g., provided by embedded magnet 404) between the pen 403 and the shaped pen dock 402 to hold the pen 403 in place. One example shape for the shaped pen dock 402 is a 90 degree arc on the device 401; thus, a pen 403 that is approximately twice as thick as the device 401 may be accommodated without increasing the device thickness/width dimension, as illustrated in FIG. 4A.

Other shapes or arcs may be utilized. For example, in an embodiment that uses a 45 degree arc for the shaped pen dock 402, a pen 403 that is four times the thickness of the device 401 can be accommodated. A 60 degree arc would likewise accommodate a pen 403 having three times the thickness of the device 401.

A tradeoff between certain features is apparent from the description herein. For example, the degrees or shape of the arc, where smaller may be better as it allows a thinner device 401, and the strength of the magnetic connection (e.g., as provided by one or more magnets 404), where a weaker magnet may be better due to a potential need for EMC shielding, e.g., via shielding element 405 and cost reasons, may need to be balanced to keep the pen 403 docked while maintaining acceptable performance and cost characteristics of the overall system. This is because, as smaller degree arcs are used, the stronger the magnetic connection needs to be. However, suitable placements of the magnet(s) 404, inclusion of shielding elements 405, and/or appropriate placement other components, e.g., placing a wireless antenna 406 away from magnet(s) 404, may be taken into account when selecting the shape of the shaped pen dock 402, its size (e.g., running the entire height dimension or only a portion thereof), and the like to achieve appropriate securing of a pen 403 without disrupting the functionality of the device 401 or the thickness profile of the device 401.

Accordingly, embodiments provide a shaped pen dock that allows a larger diameter pen to be retained or adhered to an outer surface of the device. Active connecting mechanisms, e.g., via use of one or more magnets, may be used to facilitate securing of the large diameter pen. This permits users to have a thin device while simultaneously enjoying a larger pen diameter, both of which are desired by many users.

As will be appreciated by one skilled in the art, various aspects may be embodied as a system, method or device program product. Accordingly, aspects may take the form of an entirely hardware embodiment or an embodiment including software that may all generally be referred to herein as a "circuit," "element" or "system." Furthermore, aspects may take the form of a device program product embodied in one or more device readable medium(s) having device readable program code embodied therewith.

Any combination of one or more non-signal device readable medium(s) may be utilized. The non-signal medium may be a storage medium. Program code embodied on a storage medium may be transmitted using any appropriate medium, including but not limited to wireless, wireline, optical fiber cable, RF, et cetera, or any suitable combination of the foregoing.

Aspects are described herein with reference to the figures, which illustrate example devices according to various example embodiments. It will be understood that actions and functionality may be implemented at least in part by program instructions. These program instructions may be provided to a processor of a general purpose information handling device, a special purpose information handling device, or other programmable data processing device or information handling device to produce a machine, such that the instructions, which execute via a processor of the device implement functions/acts.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An information handling device, comprising:
one or more processors;
a memory device that stores instructions executed by the one or more processors; and
a housing that contains the one or more processors and the memory device;
the housing having a substantially rectangular shape with a length and height dimension that exceed a width dimension; and
the housing further comprising a shaped pen dock running along an end of the housing and defining substantially the entire width dimension of the end of the housing;
wherein the shaped pen dock secures a pen having a diameter larger than the width dimension of the end of the housing.

2. The information handling device of claim 1, wherein the shaped pen dock further includes one or more magnets.

3. The information handling device of claim 1, wherein the end of the housing having the shaped pen dock is positioned opposite an end of the housing having an antenna disposed therein.

4. The information handling device of claim 1, wherein the shaped pen dock comprises an arc.

5. The information handling device of claim 1, wherein the shaped pen dock comprises a shape selected from the group consisting of an arc, an oval, and a square.

6. The information handling device of claim 4, wherein the arc traverses an entire length of the end of the housing.

7. The information handling device of claim 4, wherein the arc is a 90 degree arc for complimenting the shape of a circular pen.

8. The information handling device of claim 1, wherein the width dimension is less than a thickness of a customary pen diameter.

9. The information handling device of claim 8, wherein the width dimension is not more than 7mm.

10. The information handling device of claim 2, wherein a form of the shaped pen dock corresponds to one or more of: a strength of the one or more magnets;
and shielding of the one or more magnets.

11. A system, comprising:
a pen; and
an information handling device, comprising:
one or more processors;

a memory device that stores instructions executed by the one or more processors; and a housing that contains the one or more processors and the memory device;

the housing having a substantially rectangular shape with a length and height dimension that exceed a width dimension; and the housing further comprising a shaped pen dock running along an end of the housing and defining substantially the entire width dimension of the end of the housing;

wherein the pen has a diameter larger than the width dimension of the end of the housing; and wherein the shaped pen dock secures the pen.

12. The system of claim 11, wherein the shaped pen dock further includes one or more magnets.

13. A method, comprising:

disposing in a housing of an information handling device one or more processors and a memory device;

the housing having a substantially rectangular shape with a length and height dimension that exceed a width dimension; and forming a shaped pen dock running along an end of the housing and defining substantially the entire width dimension of the end of the housing;

wherein the shaped pen dock secures a pen having a diameter larger than the width dimension of the end of the housing.

14. The method of claim 13, wherein the shaped pen dock further includes one or more magnets.

15. The method of claim 13, wherein the shaped pen dock comprises an arc.

16. The method of claim 13, wherein the shaped pen dock comprises a shape selected from the group consisting of an arc, an oval, and a square.

17. The method of claim 16, wherein the arc traverses an entire length of the end of the housing.

18. The method of claim 16, wherein the arc is a 90 degree arc for complimenting the shape of a circular pen.

19. The method of claim 13, wherein the width dimension is less than a thickness of a customary pen diameter.

20. The method of claim 13, wherein the width dimension is not more than 7 mm.

* * * * *